April 22, 1969   J. E. KASTEN   3,439,751
PLOW HARROW
Filed Feb. 24, 1966
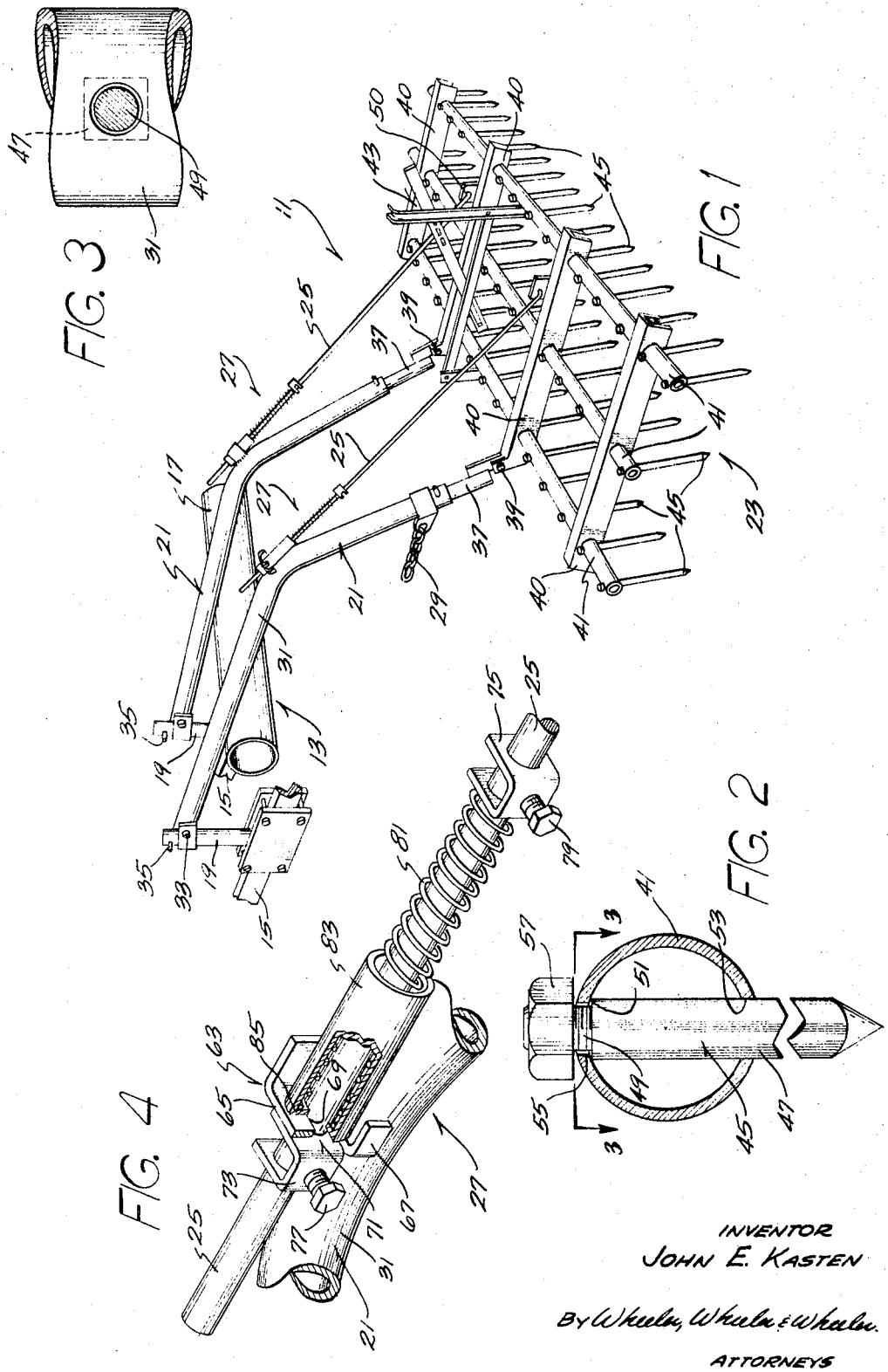
INVENTOR
JOHN E. KASTEN
By Wheeler, Wheeler & Wheeler
ATTORNEYS United States Patent Office 3,439,751
Patented Apr. 22, 1969

3,439,751
PLOW HARROW
John E. Kasten, 136 Concord Lane,
West Bend, Wis. 53095
Filed Feb. 24, 1966, Ser. No. 529,824
Int. Cl. A01b 19/00, 23/00
U.S. Cl. 172—634                                          3 Claims

ABSTRACT OF THE DISCLOSURE

Disclosed herein is a plow harrow including means releasably connecting a link supporting a spike assembly to a rod for axial movement of the link relative to the rod so as to permit pivotal movement of the spike assembly relative to the rod and for affording detachment of said link from the rod when desired.

The invention relates generally to harrows, as for example, plow harrows.

More particularly, the invention relates to plow harrows which are supported from plows and which include two or more supporting rods or beams carrying a spike assembly adjustably and yieldably positioned by one or more adjusting rods or links.

One of the principal objects of the invention is the provision of a plow harrow with means which, in addition to yieldingly and adjustably supporting the spike assembly, also serves to readily afford connection and disconnection of the adjusting rods or links to the supporting rods, whereby pivotal movement of the spike assembly in an inoperative position facilitating transport from one place to another is obtained. Such means also facilitates plowing closely alongside of a fence or other obstacle.

Another of the principal objects of the invention is the provision of a spring biased lock for releasably, adjustably, and yieldingly connecting a spike assembly adjusting link to a spike assembly supporting rod.

Another of the principal objects of the invention is a spike assembly including spikes which can be fabricated from stock of non-circular cross section by simple turning operations, together with the fabrication of mounting tubes which are punched or otherwise provided with apertures affording non-rotatable receipt of the non-circular stock and with apertures which are located in opposed relation to the openings and which receive a portion of the spike which is of reduced dimension, coupled with means which is located on the reduced dimension portion of the spike and which captures the margin of the tube surrounding the aperture, thereby preventing axial displacement of the spike relative to the tube. In the preferred construction, the portion of reduced dimension constitutes a threaded cylindrical part and the means which captures the tube margin constitutes a nut.

Another of the principal objects of the invention is the provision of a spike assembly which is strong and sturdy and which can be readily disassembled.

In general, it is a principal object of the invention to provide an improved plow harrow which can be economically manufactured and assembled and which includes one or more of the above described features.

Other objects and advantages of the invention will become known by reference to the following description and the accompanying drawings in which:

FIGURE 1 is a fragmentary perspective view illustrating a plow harrow in accordance with the invention;

FIGURE 2 is an enlarged view, partially in section, of a portion of the spike assembly incorporated in the plow harrow;

FIGURE 3 is a sectional view taken along line 3—3 of FIGURE 2; and

FIGURE 4 is an enlarged and partially broken away, sectioned fragmentary view of another portion of the plow harrow shown in FIGURE 1.

Shown in FIGURE 1 is a plow harrow 11 adapted to be connected to a plow pulled by a tractor. In the specifically disclosed construction, the harrow 11 is shown connected to a fragmentary illustrated plow 13, including a pair of fore and aft support beam 15 and an obliquely transverse boom 17.

The harrow 11 includes a pair of upright supports or masts 19 which are respectively bolted or otherwise fixedly secured to the support beams 15, a pair of support rods 21 respectively connected to the masts 19, a spike assembly 23 pivotally connected to the lower end of the support rods 21, and a pair of adjusting rods or links 25 pivotally connected at their lower ends to the spike assembly 23, together with means 27 releasably connecting the other end of the adjusting links 25 to the support rods 21 for axial movement of the links relative to the support rods, thereby to permit some pivotal movement of the spike assembly 23 relative to the support rods 21 and for affording detachment of the links 25 from the support rods 21. Also shown in FIGURE 1 is a draft chain 29 connected to one of the support rods 21.

The support rods 21 each include a bent attachment arm 31 which, at its forward end, is bolted or otherwise pivotally connected to a connector 33 having a cylindrical portion received on one of the masts 19 and affording relative rotation and axial sliding movement of the connector relative to the mast. Suitable means in the form of a pin or collar 35 are employed to limit upward movement of the support rods 21 on the masts 19. In the particularly disclosed construction, the weight of the plow harrow is, at least in part, supported by engagement of the support rods 21 on the transverse boom 17.

The support rods 21 also each include, at their lower ends, a telescopically adjustable lower section 37 which is pivotally connected to the spike assembly 23 at 39.

The spike assembly 23 comprises a plurality of stabilizer channels 40 and transverse spike mounting tubes or pipes 41. Means 43 (not a part of the invention) are provided for angularly adjustably positioning all of the tubes 41 in common relation to the stabilizer channels 40.

Extending from the tubes 41 are a plurality of spikes 45. One of the features of the invention resides in the economical construction of the spikes and in the arrangement for mounting the spikes on the tubes 41. In this regard, the spikes are fabricated from high carbon steel bars having a non-circular cross section. In the disclosed construction, the spikes 45 each includes a main body or portion 47 having a square cross section. At their lower ends, the spikes are machined to provide pointed ends and, at their upper ends, the spikes 45 are machined to provide a portion of reduced cross sectional dimension as compared to the main body. Thus, in the disclosed construction, the reduced portion comprises a cylindrical part 49 which extends from a shoulder 51 and which, in the disclosed construction, is at least partially threaded.

At each location where one of the spikes 45 is to be connected to one of the mounting tubes, the tube 41 is punctured or otherwise provided with an opening 53 dimentioned to slidably receive the spike main body or portion 47 so as to snugly laterally support the spike and prevent rotation of the spike about its length relative to the tube 41. Diametrically opposite from the opening 53, the tube 41 is provided with a circular aperture 55 which snuggly slidably receive the cylindrical portion 49 of the spike, thereby also providing lateral support.

Each spike 45 is removably fixed to the associated tube 41 by means preventing axial movement of the spike 45 relative to the tube 41. In the disclosed construction, such means is in the form of threads on the spike cylindrical portion 49 and in the form of a nut 57 which is screwed onto the cylindrical portion threads and tightened until the part of the tube constituting the margin of the cylindrical aperture 55 is captured between the nut 57 and the shoulder 51. The disclosed construction is therefore extremely sturdy, is economical to manufacture and assemble, and nevertheless affords replacement as may be necessary.

The spike assembly 23 is adjustably and yieldably retained in the desired operating position by the adjusting rods or links 25 which are pivotally connected at 50 to the pair of stabilizer channels 40.

Another of the features of the invention resides in the arrangement for releasably locking or connecting the upper ends of the adjusting links 25 to the support rods 21 so as to adjustably and yieldably maintain the spike assembly 23 in desired operating position and so as to afford disconnection of the adjusting links 25 from the support rods 21 to enable the spike assembly 23 to be pivoted into an inoperative position in adjacent relation to the adjacent parts of the support rods 21. Provision for movement to such an inoperative position is important in connection with transport of the plow harrow from one place to another and when plowing adjacent to a fence or other obstacle.

The means 27 for releasably connecting the upper ends of the adjusting links 25 to the support rods 21 are identical for each adjusting link and its associating rod and only one will therefore be described. Such means 27 includes on the support rod 21 a bracket 63 (see FIGURE 4) having an L shape with a transverse leg or web 65 and with a wall or leg 67 extending in the direction of the adjusting link 25 toward the spike assembly 23. In the specifically disclosed construction, the bracket 63 is U shaped.

The web 65 includes an aperture 69 which receives the link 25 and affords axial movement of the adjusting link 25 through the bracket 63. The leg 67 and web 65 also include a slot or notch 71 merging with the aperture 69 and affording lateral movement of the adjusting link 25 to disconnect or remove the link from the bracket 67, and therefore from the associated support rod 21.

The arrangement for yieldably and adjustably connecting the link 25 to the support rod 21 also includes a pair of adjustably located collars 73 and 75 which are releasably fixed by respective bolts 77 and 79 on the link 25, one to each side of the bracket 63. Also included is a helical coil spring 81 which telescopically surrounds the link 25 between the bracket 63 and the collar 75 located on the side of the bracket 63 adjacent to the spike assembly 23. The spring 81 is seated at its lower end against the collar 75.

Surrounding the upper end of the spring 81 in telescopic relation is a sleeve 83 which has an end portion 85 located between the adjacent end of the spring 81 and the bracket 63. The sleeve end portion includes an aperture which affords sliding movement of the sleeve 83 on the link 25 and which is dimensioned such that the margin of the end portion defining the aperture constitutes a seat for the upper end of the spring 81. The outside dimensions of the sleeve are such as to preclude lateral passage through the slot or notch 71.

In operation of the connecting means 27, whenever the spikes 45 encounter conditions which necessitate limited pivotal movement in the counter-clockwise direction, as seen in FIGURE 1, such movement is afforded, against the action of the springs 81, by sliding of the adjusting links or rods 25 through the springs 81, the sleeves 83, and the brackets 63. When the obstacle is past, the springs 81 acting against the collars 75 will return the spike assembly 23 to its normal operating position determined by engagement of the collars 73 with the webs 65 of the brackets 63.

When it is desired to swing the spike assembly 23 into transport position or otherwise substantially pivot the spike assembly 23 from its normal operating position, the links 25 can be disconnected from the support rods 21 by displacing the sleeves 83 against the action of the springs 81 until the sleeve end portions 85 are clear of the bracket legs 65. The adjusting links 25 are then laterally moved through the slots 71 until complete removal is effected. It is obvious that the adjusting links 25 can be readily reassembled by telescopically displacing the sleeves 83 to positions permitting insertion of the links 25 through the slots 71 to the apertures 69, and then releasing the sleeves 83 for travel under the action of the springs 81 to adjacent to the webs 65, thereby releasably locking the adjusting links 25 to the support rods 21.

Various of the features of the invention are set forth in the following claims.

What is claimed is:

1. A plow harrow comprising a support rod, a spike assembly pivotally connected to one end of said support rod, a link pivotally connected at one end to said spike assembly, and means releasably connecting the other end of said link to said support rod for affording axial movement of said link relative to said support rod, thereby to permit limited pivotal movement of said spike assembly relative to said support rod, and for affording detachment of said link from said support rod, said means releasably connecting the other end of said link to said support rod including an open-ended slot connected with said support rod, receiving said link, and permitting lateral movement of said link to afford detachment of said link from said rod, said last mentioned means also including a spring operative to bias said spike assembly toward an operative position and to simultaneously prevent unwanted detachment of said link from said support rod.

2. A plow harrow comprising a support rod, a spike assembly pivotally connected to one end of said support rod, a link pivotally connected at one end to said spike assembly, a bracket fixed to said support rod and having a slot extending to one end of said bracket and slidably receiving said link to afford axial movement of said link relative to said support rod, thereby to permit limited pivotal movement of said spike assembly relative to said support rod, a spring, a sleeve in telescopic relation to said link and in engagement with said spring such that said sleeve is biased toward said bracket by said spring, and means on said bracket and said sleeve for preventing removal of said link from said slot in the absence of movement of said sleeve away from said bracket and for affording removal of said link from said bracket subsequent to displacement of said sleeve away from said bracket.

3. A plow harrow comprising a support rod adapted to be connected to a plow, a spike assembly pivotally connected to the lower end of said support rod, a link pivotally connected at one end to said spike assembly, a bracket on said support rod spaced from the pivotal connection of said support rod and said spike assembly, said bracket including a web and a leg extending transversely of said web and toward said spike assembly, said web including therein an aperture receiving said link and affording axial movement of said link relative to said bracket, said leg and said web including a slot communicating with said aperture to afford removal of said link from said bracket, a pair of spaced collars respectively fixed to each side of said bracket, a helical spring surrounding said link, located between said bracket and said collar positioned between said bracket and said spike assembly and seated at one end against said last mentioned collar, and a sleeve located in overlying telescopic relation to said spring, said sleeve having at one end a portion located between said bracket and the adjacent end of said spring, said portion having an opening affording axial sliding movement of said sleeve relative to said link, said opening being dimensioned so that said portion provides a spring seat around said opening, and said sleeve being dimensioned so as to preclude movement thereof through said slot, whereby in order to detach said link from said support rod, said sleeve is first displaced axially of said link toward said spike assembly and against the action of said spring to clear said bracket leg and then said link is displaced through said slot.

References Cited

UNITED STATES PATENTS

| | | | |
|---|---|---|---|
| 162,295 | 4/1875 | McPherson | 172—763 |
| 287,531 | 10/1883 | Fulmer | 172—763 |
| 3,263,757 | 8/1966 | Kaster | 172—198 |

FOREIGN PATENTS

| | | |
|---|---|---|
| 143,673 | 6/1935 | Austria. |
| 342,554 | 10/1920 | Germany. |

ABRAHAM G. STONE, *Primary Examiner.*

S. C. PELLEGRINO, *Assistant Examiner.*

U.S. Cl. X.R.

172—500